United States Patent
Raper (10) Patent No.: US 10,450,963 B2
(45) Date of Patent: Oct. 22, 2019

(54) SHAFT SEAL CRACK OBVIATION

(71) Applicant: Rolls-Royce Corporation, Indianapolis, IN (US)

(72) Inventor: Chris Raper, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 24 days.

(21) Appl. No.: 15/584,992

(22) Filed: May 2, 2017

(65) Prior Publication Data

US 2018/0320596 A1 Nov. 8, 2018

(51) Int. Cl.
| | |
|---|---|
| *F02C 7/28* | (2006.01) |
| *F16J 15/3232* | (2016.01) |
| *F16J 15/3284* | (2016.01) |
| *F01D 11/02* | (2006.01) |
| *F16J 15/44* | (2006.01) |
| *F02C 3/04* | (2006.01) |

(52) U.S. Cl.
CPC ............... *F02C 7/28* (2013.01); *F01D 11/02* (2013.01); *F16J 15/3232* (2013.01); *F16J 15/3284* (2013.01); *F16J 15/444* (2013.01); *F02C 3/04* (2013.01); *F05D 2220/32* (2013.01)

(58) Field of Classification Search
CPC ...... F16C 33/80; F16J 15/447; F16J 15/3284; F16J 15/3232; F16J 15/4476; F16J 15/4472; F02C 7/28; F01D 11/001; F01D 11/08
See application file for complete search history.

(56) References Cited

U.S. PATENT DOCUMENTS

| | | | | |
|---|---|---|---|---|
| 4,022,479 | A * | 5/1977 | Orlowski | F16J 15/4474 277/347 |
| 4,114,902 | A * | 9/1978 | Orlowski | F16J 15/4474 277/427 |
| 4,767,267 | A * | 8/1988 | Salt | F01D 11/001 415/173.7 |
| 5,143,383 | A | 9/1992 | Glynn et al. | |
| 6,343,792 | B1 * | 2/2002 | Shinohara | F01D 11/001 277/345 |
| 8,251,371 | B2 | 8/2012 | Gaebler | |
| 8,413,992 | B2 * | 4/2013 | Uehara | F01D 11/001 277/355 |
| 2004/0012151 | A1 * | 1/2004 | Beeck | F01D 5/225 277/415 |
| 2009/0058013 | A1 * | 3/2009 | Bulgrin | F01D 11/001 277/419 |
| 2009/0200744 | A1 * | 8/2009 | Rice | F16J 15/3224 277/300 |
| 2010/0148449 | A1 | 6/2010 | Gaebler | |
| 2014/0020403 | A1 * | 1/2014 | Tsukuda | F01D 11/001 60/805 |

FOREIGN PATENT DOCUMENTS

JP 2014139451 A * 7/2014 .......... F16C 33/7876

* cited by examiner

*Primary Examiner* — Eugene G Byrd
(74) *Attorney, Agent, or Firm* — Duane Morris LLP (57) ABSTRACT

A rotating labyrinth seal especially useful for effecting sealing between two plenums in aircraft gas turbine engines comprising a base and a plurality of radially-directed seal teeth rings extending circumferentially around the outer peripheral surface of the base. The fins in the rotating seal each having a discontinuity that reduces hoop stress on the outer radial surface. The discontinuities in each fin are offset from the discontinuities in the adjacent fins.

10 Claims, 8 Drawing Sheets

SHAFT SEAL CRACK OBVIATION

FIELD OF THE DISCLOSURE

The present disclosure relates generally to turbine machines, and more specifically to seal assemblies for sealing between rotating components of a gas turbine engine.

BACKGROUND

Rotating labyrinth seals have a wide variety of uses and one such use is to effect sealing between plenums at different pressures in gas turbine engines. Such seals generally consist of two principal elements, i.e., a rotating seal and a static seal. The rotating seal, in cross section parallel to the axial length of the engine, frequently has rows of thin tooth-like projections extending radially from a relatively thicker base toward the static seal. The static seal or stator is normally comprised of a thin abradable configuration. These principal elements are generally situated circumferentially about the axial (lengthwise) dimension of the engine and are positioned with a small radial gap there between to permit assembly of the rotating and static components.

Figure 1:
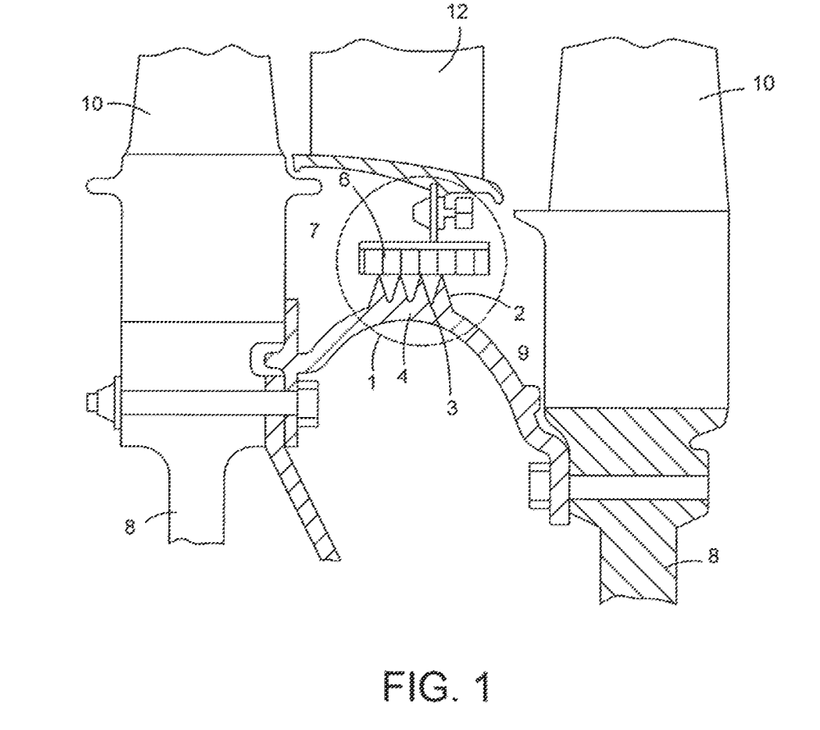
FIG. 1 illustrates a prior art seal configuration.

Referring to FIG. 1 of the drawings, there is shown a partial view of an exemplary high pressure turbine section which is a section of aircraft gas turbine engine which typically utilize rotating labyrinth seals 1. The high pressure turbine includes a plurality of radially extending stage-one blades suitably mounted in a stage-one turbine and a plurality of radially extending, stage-two blades suitably mounted in stage-two turbine disks. The disks are labeled 8 and the blades 10. Stage-one blade 10 and disk 8 lie upstream in relation to downstream stage-two blade 10 and disk 8. The flow of hot gases in the high pressure turbine is from upstream to downstream, i.e., from left to right in FIG. 1.

The rotating labyrinth seal 1 includes a rotating portion 3 (comprised of fins 2 and base 4) and a stator or static seal 6. Rotating portion 3 is suitably mounted between the stage-one turbine disk 8 and the stage-two turbine disk 8. Stationary static seal 6 is attached to stage-two nozzle 12. The stage-one nozzle (not shown) lies upstream from the stage-one blades.

The rotating portion 3 comprises base 4 and a plurality of seal teeth 2 radially extending from the outer peripheral surface of base 4. The outer circumference of the seal teeth 2 rotate within a small tolerance of the inner circumference of the stator 12, thereby effecting a sealing between stage-one plenum 7 and stage-two plenum 9. Base 4, as shown, has an annular configuration and a generally arcuate cross section, but other configurations are frequently encountered in gas turbine engines. Seal teeth 2 may be attached to the base 4, as by welding, or be integrally machined in to the base 4 and extend in ring-like fashion circumferentially about base 4 and axial centerline (not shown).

When the gas turbine engine is operated, the rotating portion 3 expands radially more than the stator 6 and rubs into the stator 6. The rotating seal teeth tips are made thin in order to thermally isolate them from the supporting base 4 or shell structure.

Figure 2:
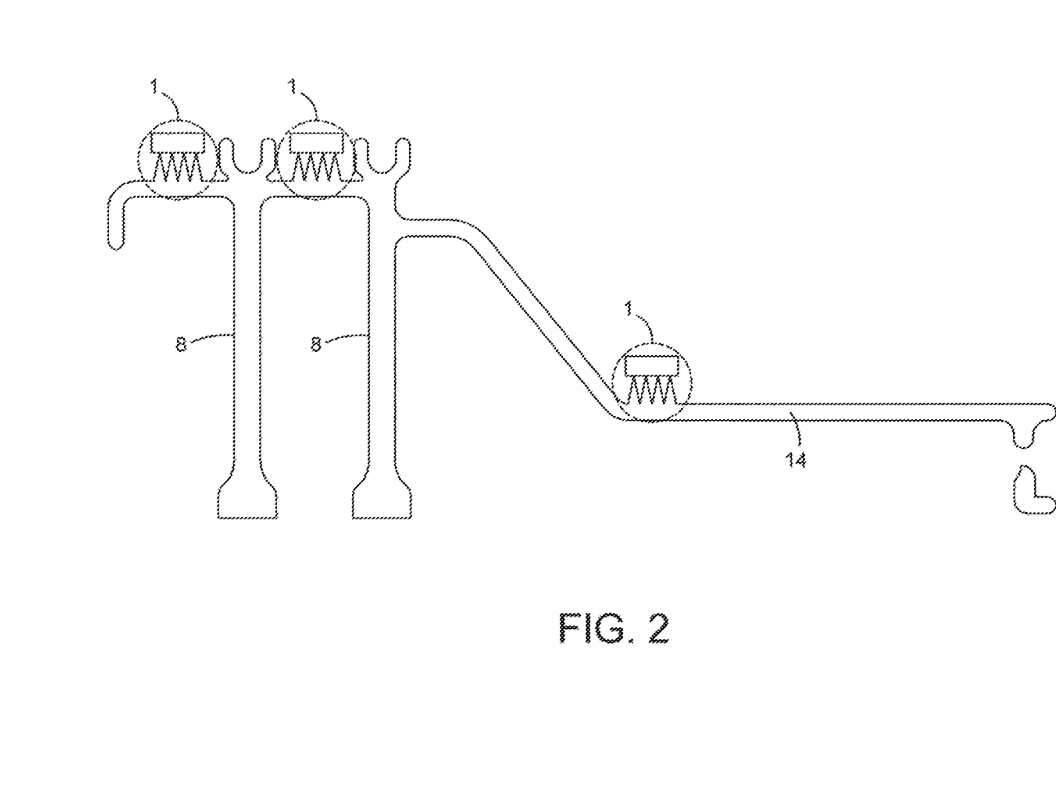
FIG. 2 illustrates another prior art seal configuration.

The thin tooth (fin) 2 is, however, susceptible to handling damage which can result in cracks in the tips of the teeth opposite the base 4. Conventional rotating seals (knife seals or labyrinth seals) on discs 8 and shafts 114 (see FIG. 2) have commonly exhibited cracking in service caused by rub damage. These cracks may propagate into the torque-carrying load path. As shown in FIG. 2, the seals 1 are in the load path, or integral into the structure which carries the torsional loads between the compressor and the turbines, or between stages. FIG. 2 shows the seal fins 2 integrated in the shaft 14 and the disks 8. The crack propagation from the fins 2 could cause the shaft to break, causing turbine over speed and potential turbine disc burst (a hazardous event). The cracks could also propagate into the body of an integral disc, potentially leading to disc burst (a hazardous event).

The propagation of cracks in seal fins may also result in increased economic cost, even absent catastrophic damage. Cost associated with fleet inspections and adjustment of seal clearances as well as the cost of expensive coatings to avoid rub damage, may be minimized by reducing or eliminating the risk of crack propagation.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

Figure 3:
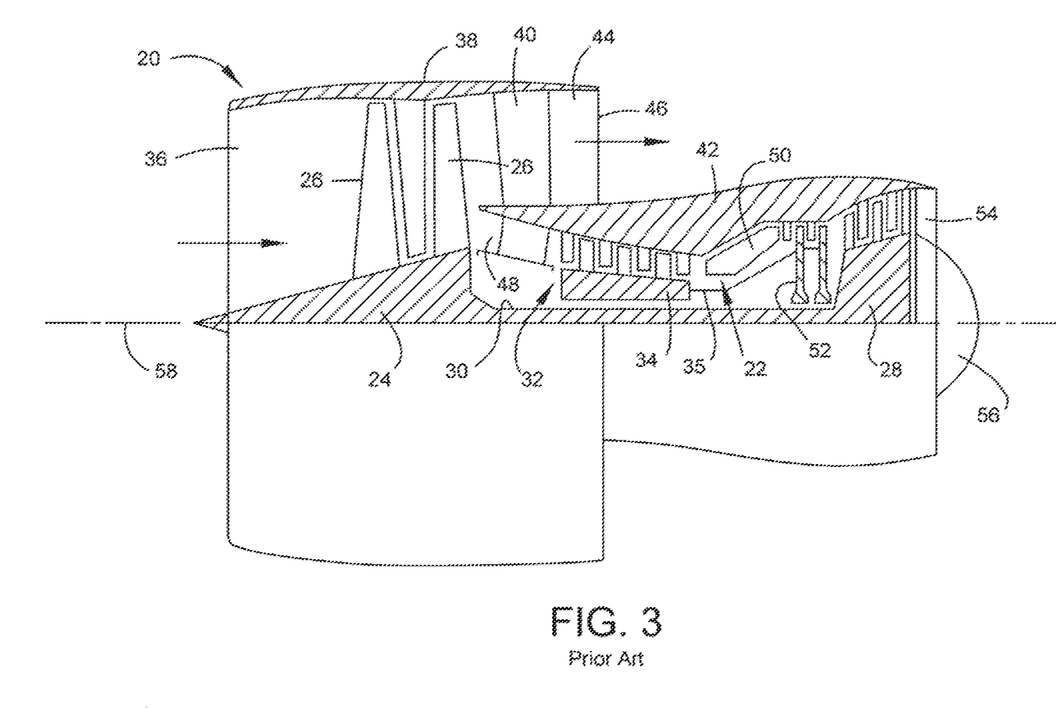
FIG. 3 illustrates a conventional gas turbofan engine.

Referring to FIG. 3 of the drawings, there is diagrammatically illustrated a gas turbofan engine, generally designated by the numeral 20. While it is recognized that turbofan engines are well known in the art, a brief description of the operation of engine 20 will enhance appreciation of the interrelationship of the various components by way of background for the invention to be described below. Basically, engine 20 may be considered as comprising core engine 22, fan 24 including a rotatable stage of fan blades 26, and fan turbine 28 downstream of core engine 22 and which is interconnected to fan 24 by shaft 30. Core engine 22 includes axial flow compressor 32 having rotor 34. Air enters inlet 36 from the left of FIG. 3, in the direction of the solid arrow, and is initially compressed by fan blades 26.

A fan cowl or nacelle 38 circumscribes the forward part of engine 20 and is interconnected therewith by a plurality of radially outwardly extending outlet guide vane assemblies 40, (one shown) substantially equiangularly spaced apart around core engine cowl 42. A first portion of the relatively cool, low pressure compressed air exiting fan blades 26 enters fan bypass duct 44 defined between core engine cowl 42 and fan cowl 38, and discharges through fan nozzle 46. A second portion of the compressed air enters core engine inlet 48, is further compressed by axial flow compressor 32, and is discharged to combustor 50 where it is mixed with fuel and burned to provide high energy combustion gases which drive core (or high pressure) engine turbine 52. Turbine 52, in turn, drives rotor 34 by means of shaft 35 in the usual manner of gas turbine engines. The hot gases of combustion then pass through and drive fan (or low pressure) turbine 28 which, in turn, drives fan 24. A propulsive force is thus obtained by the action of fan 24 discharging air from fan bypass duct 44 through fan nozzle 46 and by the discharge of combustion gases from core engine nozzle 54 defined, in part, by plug 56 and cowl 42 of core engine 22. It will be appreciated that the pressure of the various gases within the engine 20 will vary as a function of position along engine axial centerline 58. To isolate the various sections and the pressures therein from each other, rotating labyrinth seals are commonly used.

Figure 4A:
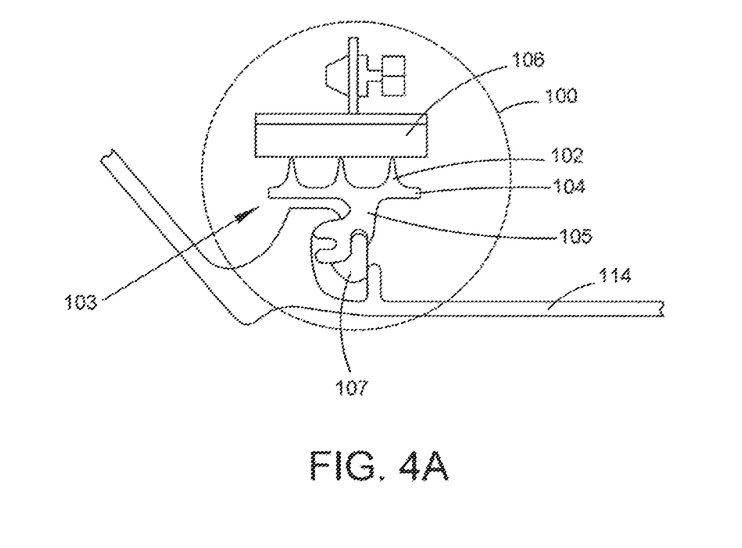
FIGS. 4a & 4b illustrate a non-crack propagating seal according to an embodiment of the disclosed subject matter.
Figure 4B:
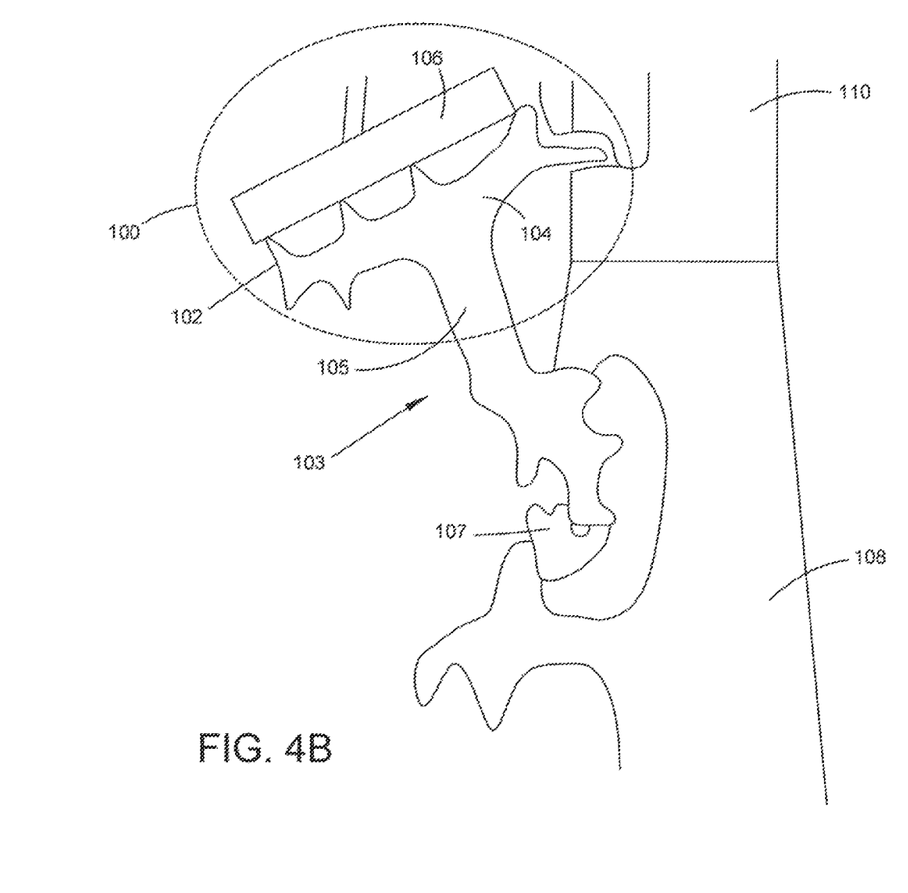

FIGS. 4a and 4b illustrate labyrinth seal configurations which address the problem of crack propagation into the load paths. The embodiments introduce a separate component within the seal geometry such that cracks which initiate in the fins 102 cannot propagate into the shaft 114 or disk 108. FIG. 4a shows labyrinth seal 100, having a rotation portion 103 composes of fins 102, base 104 and leg 104. The base 104 as shown may include a portion which cantilevers from the leg 105. While the number of fins 102 in the figures are 3 and 4 respectively any number of fins 102 are envisioned.

The labyrinth seal 100 also includes the stator 106 which is engaged by the fins 102. The stator 106 is fixed and disposed opposite and radially outward from the plurality of teeth 102, the fixed stator 106 having an inner radial surface configured to interact with the plurality of fins 102 to create a seal between two cavities on either side of the seal 100. The rotating portion 103 is retained on the shaft 114, via a retaining ring 107 which presses the rotating portion 103 against an engagement surface on the shaft 114. In FIG. 4b, the labyrinth seal 100 is positioned on disc 108. The leg 105 includes an engagement surface which abuts an attachment surface on the respective shaft 114 or disc 108, the engagement surface and attachment surfaces are contoured to be complimentary. The attachment surface may include one or both of a radially restraining surface and an axially restraining surface and likewise, the engagement surface may include both an axially and radially extending surfaces.

These arrangements obviate the potentially hazardous effects of seal cracking by separating the seals from the load transmitting structures. The seals depicted in FIGS. 4a and 4b illustrate common seal positions on a shaft 114, disc 108. The shaft 114 and the disc 108 are torque transmitting structures which rotate about the axis 58 of the engine (see FIG. 3) however other locations on load paths are likewise envisioned.

Figure 5A:
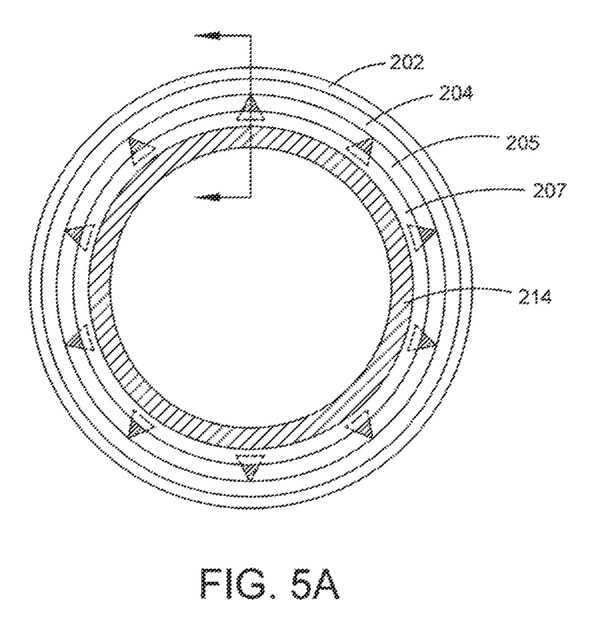
FIGS. 5a & 5b illustrate an axial view of the non-crack propagating seal of FIG. 4a and cross section thereof according to an embodiment of the disclosed subject matter.

Alternatively, the rotating portion 103 may be affixed to the turbine components using axial and circumferential dovetails (as typically used for blades) a spanner nut (as typically used for bearings). FIG. 5a illustrates the attachment of the rotation portion 203 to the shaft 214 via legs 205 (tenons). The rotating portion 103 is restrained radially and circumferentially by the interactions of the dovetail tenons 205 with recesses (mortise/attachment surface) in the shaft 214.

Figure 5B:
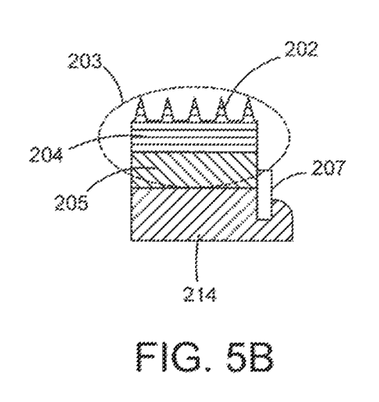

FIG. 5b shows a cross section of the rotating portion 103 affixed to the shaft 214. The teeth/fins 202 attached to the base 204 from which the tenons 205 extend into mortises formed in the shaft 214 (or key and keyway). The rotating portion 103 is retained from axial movement by ring 207 seated in a corresponding groove in the shaft 214.

Alternative mechanisms to attach or retain the rotating portion 103 of the labyrinth seals to the disk 108, or shaft 114 may include the use of bolts, pins, spanner nut(s), and/or bayonet feature(s).

Figure 6A:
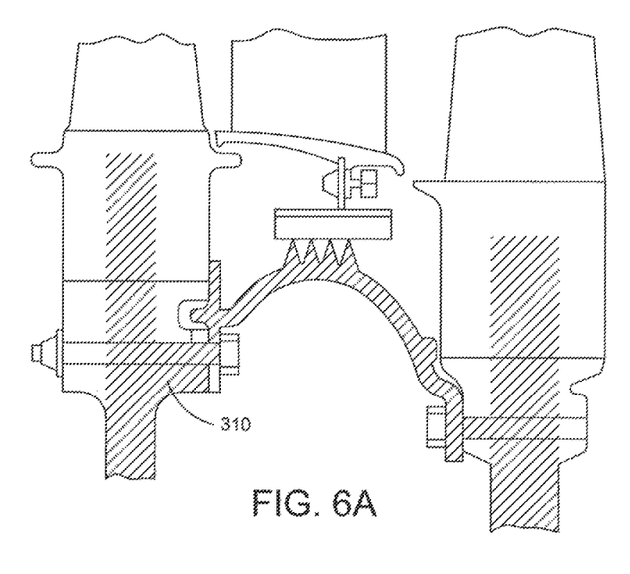
FIGS. 6a and 6b illustrates the load paths in prior art labyrinth seals and an embodiment of the discloses subject matter respectively.

FIG. 6a shows the load paths 310 in the prior art labyrinth seal. The load paths 310 transfer load from the blades 10, through the disks 8 to the shaft and through the base 4 from the forward disk to the downstream disk. As noted previously a failure any of the structural members carrying the load could result in catastrophic failure. A failure of the base 3 could result in an overload of one of the discs, likewise if the base was integrated in the shaft 14 as shown in FIG. 2, a failure in the shaft may also result in a catastrophic engine failure.

Figure 6B:
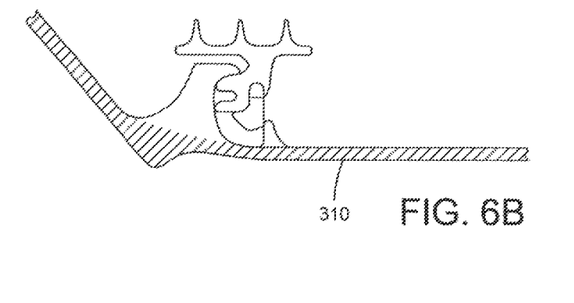

FIG. 6b shows the load path 310 through the shaft 114 according to embodiments of the disclosed subject matter. As shown, the load path 310 of the shaft 114 does not pass through the rotating portion 103 of the labyrinth seal 100 and thus the shaft 114 is isolated from seal crack propagation and subsequent failure.

Another embodiment of the disclosed subject matter is shown in FIG. 7. This embodiment reduces crack propagation into the load carrying structures by addressing crack origination in the seal. Cracks in a seal fin generally initiate at the outer radial tip shown as 771. To reduce hoop stress on the outer tip, which is the predominate factor in crack initiation; one or more notches 777a-d are advantageously formed into each of the seal fins 702. The lower hoop stress in the tip 771 of the seal fin, mitigating the ability for the crack to originate and further propagate. The machined notch 777a-d will result in a stress concentration at the bottom (proximate the valley 773) but seal fins 702 usually have low hoop stress, and are substantially thicker proximate the valley 773 because the fins are tapered, so the location of the induced stress concentration will not likely initiate a crack.

Figure 7A:
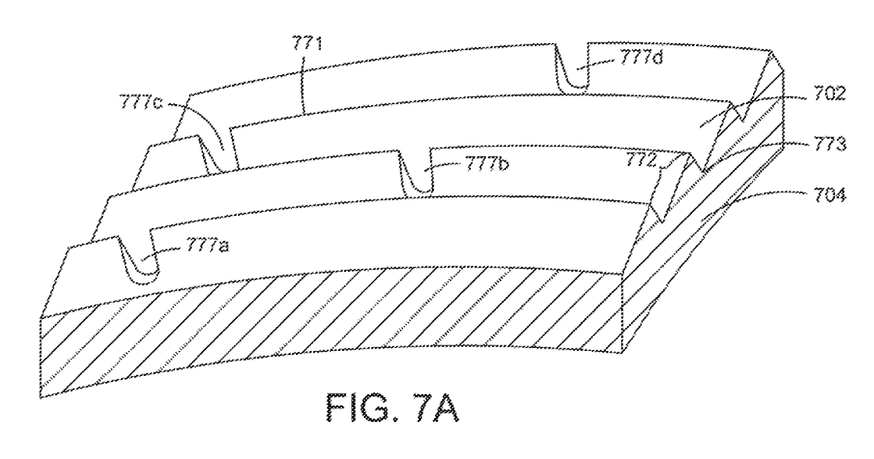
FIGS. 7a and 7b illustrate an alternative embodiment to minimizing crack initiation and propagation in a labyrinth seal.

An important aspect of this embodiment is the introduction of a void in the seal fin 702 in which gases may pass thereby reduce the effectiveness of the seal. In order to minimize the reduction in effectiveness while maintaining the crack minimization, the cross sectional area of each notch 777 and the number of notches should be minimized such the axial projection of the area of notch is significantly smaller that the axial projection area of the fin 702. In addition, the circumferential location of the notches 777 a-d on adjacent seal fins should be offset to present a restrictive flow path for any gas passing through the notches as shown in FIG. 7a. These offsets being determined as a function of the number of fins and notches. For example, a two fin seal with one notch each would preferably be offset by 180 degrees, whereas the offset for three fins would preferably be 120. The offset is FIG. 7a is for illustrative purposes only, and other offsets are equally envisioned, so long as alignment of adjacent notches is avoided.

Figure 7B:
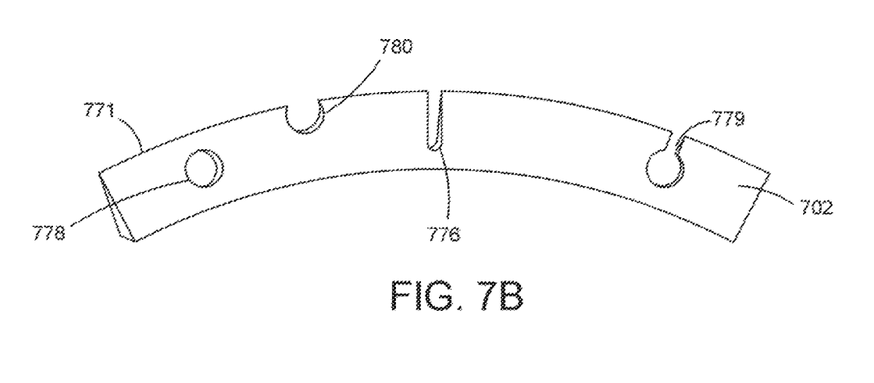

As shown in FIG. 7a, the notch is U shaped with the opening facing radially outward. In FIG. 7b, the notch 778 is shown as a hole. The shape of notch 778 allows prevents crack propagation from a crack in area 780 while minimizing loss in seal effectiveness. The notch may also be shaped as a truncated circle 780, slot 776, or key 779. The notch may be machined and is preferably polished, particularly on the inner surface where the stress concentration is introduced.

The present application discloses one or more of the features recited in the appended claims and/or the following features which, alone or in any combination, may comprise patentable subject matter.

According to aspects of the present disclosure, a fin seal comprises a plurality of concentric fins, each of the plurality of concentric fins at least axially displaced from an adjacent one of the concentric fins; each of the concentric fins have a base, each of the concentric fins extend from the base to an outer radial edge, each the concentric fins having a thickness in the axial direction at the base greater than the thickness at the outer radial edge; each of the concentric fins further comprising at least one notch extending through the thickness of the fin and from the outer radial edge towards the respective base; and, a stator being concentric with the plurality of concentric fins and in contact with the outer radial edges of the plurality of fins.

In some embodiments the at least one notch of each concentric fin is circumferentially offset from the at least one notch in each adjacent concentric fin. In some embodiments the notch is "U" shaped with opening radially outward. In some embodiments notches in adjacent concentric fins are offset as a function of the number of fins, and number of notches.

In some embodiments the at least one notch comprises two or more notches. In some embodiments the notches in adjacent concentric fins are offset by 180 degrees or less. In some embodiments the notches in adjacent concentric fins are offset by 120 degrees or less. In some embodiments the notches in adjacent concentric fins are offset by 90 degrees or less. In some embodiments the notches in adjacent concentric fins are offset by at least 60 degrees of less. In some embodiments the notch is circular. In some embodiments the notch is a truncated circle shape.

According to some aspects of the present disclosure, a fin seal comprises a plurality of concentric fins, each of the plurality of concentric fins at least axially displaced from an adjacent one of the concentric fins; each of the concentric fins having a cross section with a maximum thickness at a base and narrowing as the fin extends radially to an outer radial edge; each of the concentric fins further comprising at least one interruption of the fin, the interruption extending through the thickness of the fin and located proximate the outer radial edge; and, a stator being concentric with the plurality of concentric fins and in contact with the outer radial edges of the plurality of fins.

In some embodiments the interruption is "U" shaped with an opening radially outward. In some embodiments the at least one interruption of each concentric fin is circumferentially offset from the at least one interruption in each adjacent concentric fin. In some embodiments notches in adjacent concentric fins are offset as a function of the number of fins, and number of notches. In some embodiments the at least one notch comprises two or more notches. In some embodiments the interruption is a hole. In some embodiments the interruption is a slit.

According to some aspects of the present disclosure, a method is disclosed of reducing crack propagation in a fin seal having a plurality of adjacent concentric fins, each fin circumferentially around an axis. The method comprises introducing a first discontinuity in a first fin of a plurality of adjacent concentric fins at a first circumferential location; introducing a second discontinuity in a second fin, the second fin being adjacent to the first fin, the location of the second discontinuity being offset circumferentially from the first discontinuity; wherein the first and second discontinuity extend axially through the first and second fins respectively.

In some embodiments the method further comprises polishing the radially inner surface of the first and second discontinuities.

Although examples are illustrated and described herein, embodiments are nevertheless not limited to the details shown, since various modifications and structural changes may be made therein by those of ordinary skill within the scope and range of equivalents of the claims.

What is claimed is:

1. A fin seal comprising:
   a plurality of concentric fins, each of the plurality of concentric fins at least axially displaced from an adjacent one of the concentric fins;
   each of the concentric fins have a base, each of the concentric fins extend from the base to an outer radial edge, each the concentric fins having a thickness in the axial direction at the base greater than the thickness at the outer radial edge;
   each of the concentric fins further comprising at least one notch extending through the thickness of the fin and from the outer radial edge towards the respective base; and,
   a stator being concentric with the plurality of concentric fins and in contact with the outer radial edges of the plurality of fins;
   wherein each of the at least one notch of each concentric fin is circumferentially offset from each of the at least one notch in each adjacent concentric fin;
   wherein the offset is at least D, where $D=360/(N_n*N_f)$ where $N_f$ is the number of fins, $N_n$ is the number of notches per fin.

2. The fin seal of claim 1, wherein the offset is 180 degrees or less.

3. The fin seal of claim 2, wherein the offset is 120 degrees or less.

4. The fin seal of claim 3, wherein the offset is 90 degrees or less.

5. The fin seal of claim 4, wherein the notches in adjacent concentric fins are offset by at least 60 degrees or less.

6. A fin seal comprising:
   a plurality of concentric fins, each of the plurality of concentric fins at least axially displaced from an adjacent one of the concentric fins;
   each of the concentric fins having a cross section with a maximum thickness at a base and narrowing as the fin extends radially to an outer radial edge;
   each of the concentric fins further comprising at least one interruption of the fin, the interruption extending through the thickness of the fin and located proximate the outer radial edge; and,
   a stator being concentric with the plurality of concentric fins and in contact with the outer radial edges of the plurality of fins;
   wherein the at least one interruption is a hole.

7. The fin seal of claim 6, wherein the at least one interruption of each concentric fin is circumferentially offset from the at least one interruption in each adjacent concentric fin.

8. The fin seal of claim 7, wherein the at least one interruption in adjacent concentric fins are offset as a function of the number of fins, and number of interruptions.

9. The fin seal of claim 6, wherein the at least one notch interruption comprises two or more notches.

10. A method of reducing crack propagation in a fin seal having a plurality of adjacent concentric fins, each fin circumferentially around an axis, the method comprising:
    introducing a first discontinuity in a first fin of a plurality of adjacent concentric fins at a first circumferential location;
    introducing a second discontinuity in a second fin, the second fin being adjacent to the first fin, the location of the second discontinuity being offset circumferentially from the first discontinuity;
    wherein the first and second discontinuity extend axially through the first and second fins respectively; further comprising polishing the radially inner surface of the first and second discontinuities.

* * * * *